(12) United States Patent
Ozdemir

(10) Patent No.: US 7,644,705 B2
(45) Date of Patent: Jan. 12, 2010

(54) FUEL DELIVERY SYSTEM

(76) Inventor: Phillip Nuri Ozdemir, 89 Emerald La., Williamstown, MA (US) 01267

( * ) Notice: Subject to any disclaimer, the term of this patent is extended or adjusted under 35 U.S.C. 154(b) by 39 days.

(21) Appl. No.: 11/380,977

(22) Filed: May 1, 2006

(65) Prior Publication Data
US 2006/0249129 A1 Nov. 9, 2006

Related U.S. Application Data

(60) Provisional application No. 60/677,299, filed on May 4, 2005, provisional application No. 60/699,589, filed on Jul. 18, 2005.

(51) Int. Cl.
*F02M 51/00* (2006.01)
(52) U.S. Cl. ...................... 123/557; 123/700
(58) Field of Classification Search ......... 123/543–557, 123/700, 703, 704, 585, 590
See application file for complete search history.

(56) References Cited

U.S. PATENT DOCUMENTS

| | | | |
|---|---|---|---|
| 3,800,533 A | 4/1974 | Zamkowski | |
| 3,851,633 A | 12/1974 | Shih | |
| 4,177,779 A | 12/1979 | Ogle | |
| 4,246,879 A * | 1/1981 | Fiala | 123/533 |
| 4,469,075 A * | 9/1984 | Jackson et al. | 123/523 |
| 4,476,840 A | 10/1984 | Budnicki | |
| 4,515,134 A * | 5/1985 | Warren, II | 123/557 |
| 4,553,520 A * | 11/1985 | Lindenmaier et al. | 123/557 |
| 4,781,165 A * | 11/1988 | Rawlings | 123/555 |
| 5,384,074 A | 1/1995 | Pedersen | |
| 5,564,399 A | 10/1996 | Pedersen | |
| 5,644,866 A | 7/1997 | Katsuda et al. | |
| 2004/0045533 A1* | 3/2004 | Sukegawa et al. | 123/478 |

OTHER PUBLICATIONS

Erdemir, A., et al. "Tribological Properties of Nanocrystalline Diamond Films" DOE Contract W-31-109-Eng-38.

(Continued)

*Primary Examiner*—M. McMahon

(57) ABSTRACT

Fuel delivery system for an internal combustion engine comprising a method and apparatus for generating and delivering a homogeneous charge with a variable fuel/air ratio which relies on fuel-absorbent, air-permeable evaporative wick membranes in a primary mixing region to which a portion of thermally-regulated air from an air dividing region has come. A single moving control element is used to control the quantity of in-rushing air in the primary mixing region, and therefore the amount of fuel rich air produced in this primary mixing region, and at the same time this single moving control element modulates both the quantity of fuel rich air and the quantity of regular fuel-free combustion air which are brought together in a secondary mixing region where they combine in the desired ratio to form a homogeneous charge with a variable fuel/air ratio. The use of a single moving control element allows extremely economical construction. A further advantage of this method is extremely rapid and accurate control of the fuel/fair ratio of the charge which is generated. The method can be used to safely and reliably generate clean-burning combustible mixtures for internal combustion engines, and to cool supercharged and turbocharged airstreams. Electronic control means are also provided to calculate the correct fuel/air ration under various engine operating and environmental conditions and so that spark plug timing and electromechanical valve timing can be adjusted in concert with adjustments to the fuel/fair ratio so that optimum fuel economy and emissions performance is obtained.

18 Claims, 2 Drawing Sheets

OTHER PUBLICATIONS

WWW.CANCERWEB.NCL.AC.UK, On-line Medical Dictionary definition of "foraminiferous", at http://cancerweb.ncl.ac.uk/cgi-bin/omd?foraminiferous.

DICTIONARY.DIE.NET, another online dictionary definition of "foraminiferous" taken from Webster's Unabridged Dictionary (1913).

* cited by examiner

FUEL DELIVERY SYSTEM

CROSS-REFERENCE

This application claims the benefit of earlier-filed provisional applications 60/677,299 ("Method of Generating a Homogeneous Charge with a Variable Fuel/Air Ratio") filed on May 4, 2005 and 60/699,589 ("Method of Cooling a Supercharge") filed on Jul. 18, 2005.

BACKGROUND OF THE INVENTION

1. Field of the Invention

This invention relates to the problem of delivering a combustible mixture of fuel and air to an internal combustion engine or other combustion appliance. It also relates to the problem of cooling a supercharge.

2. Background Art

Conventional carburetors and fuel injectors for internal combustion engines, as well as for other appliances, generate a heterogenous two phase product which consists of a liquid fuel phase and a gaseous combustion air phase. The incomplete mixing of the fuel and air leads to inefficient combustion, fuel wastage, and unnecessary pollution. Estimates vary, but some say up to 40-50% of fuel is wasted because of incomplete combustion. Vapor phase carburetors have been invented which attempt to deal with this problem by generating a molecular vapor from the liquid fuel before it is introduced into the combustion chamber. If a molecular vapor can be generated safely and effectively, and delivered to the combustion chamber in controlled dosages, essentially complete fuel combustion can be achieved, and much greater fuel economy can be achieved. However, it takes a tremendous amount of heat to vaporize traditional liquid fuels for internal combustion engines. For instance, a 235 horsepower engine at full load requires 10,486 watts of heat just to vaporize the fuel if liquid hexane is used as the fuel, assuming the liquid hexane is at or just below the liquid-gas phase change temperature just prior to vaporization.

The majority of the prior art vapor carburetion schemes seek to heat up the liquid fuel directly by surrounding the liquid fuel with a heating means or surrounding the heating means with a reservoir of liquid fuel, or by placing the heating means adjacent to the liquid fuel. The three main heating means employed in vaporizing fuel delivery systems are (1) heat supplied by the engine's exhaust system; (2) heat supplied by the engine's cooling system; and (3) heat supplied by electrical resistance heaters. Examples of devices using the engine's exhaust system as the heat source are the inventions of Zankowski (U.S. Pat. No. 2,800,533) and Budnicki (U.S. Pat. No. 4,476,840). An example of devices using the engine's cooling system as the heat source are the inventions of Ogle (U.S. Pat. No. 4,177,779). An example of a device using an electrical resistance heater as the heat source is the invention of Shih (U.S. Pat. No. 3,851,633).

In theory, it is acceptable to use electrical resistance heaters in such schemes because while in absolute terms the amount of heat necessary to turn the liquid fuel into vapor is quite high (viz., 10,486 watts) the relative amount is fairly low, say only about 2-40% of the gross engine output power. In other words, if the electrical resistance vaporization scheme adds a 40% fuel efficiency by giving the engine the opportunity to burn a homogeneous molecular vapor instead of a crudely mixed aerosol, then one can live with the 2-40% parasitic electrical generation load required. A further reason to use electrical resistance heating is that such a heating means is precisely controllable by carefully controlling the current through the heating circuit (Joule's Law). However, in some cases, the added parasitic load inefficiency, compounded by further inefficiencies in the belt, pulley, and bearing losses from the generator, make a significant operating cost difference. Furthermore the use of electrical resistance heating necessitates the cost and weight of expensive, heavy electrical generators and wiring harnesses; and is unsafe due to the hazard of electrical sparks and short-circuits developing in close proximity to the combustible mixtures.

Since there are already two sources of waste heat present in most internal combustion engines, the exhaust gases and the circulating coolant, an object of a more perfectly finessed invention is to rely on one of these already-present sources of heat rather than adding others. Both of these two sources have the added advantage that the available heat increases with the engine's demand for fuel on a roughly linear basis. The problem with using exhaust gases, however, is that it is extremely unsafe to put exhaust gases in close proximity to gasoline and combustible volatile mixtures. The closer the exhaust gas heat source and the thinner the partition between the exhaust gas stream and the gasoline, the better the heat transfer to the gasoline and the more efficient the vaporization process; but the more dangerous the situation can be should the partition fail and some of the hot, still-burning pieces of carbon and microscopic metal fragments enter into the gasoline.

One particular sub-class of vapor carburetor schemes which relies on the engine's circulating coolant to supply the heat necessary for vaporization is represented by the device of Ogle (U.S. Pat. No. 4,177,779) which relies on a large radiator placed inside the car's main fuel tank. The basic problem with devices of this sub class are safety and reliability. One sees that if Ogle dispenses with the car's "regular" radiator and goes only with a radiator in the gas tank, approximately ⅓ of the engine's heat would be supplied to the gas tank, whereas only 2-4% would be needed for the fuel vaporization. There would thus be a significant excess of gasoline vapor produced over and above that needed for engine operation. The interior gas tank pressures would soon go beyond practical limits unless extremely heavy pressure vessels were constructed to obviate this problem. This extra weight would eliminate the increased fuel efficiency desired. Using smaller radiators only lessens this problem. Furthermore, as the tank is drawn down, the changing heat transfer characteristics of the embedded radiator and the remnant fuel would represent an additional layer of complexity as far as keeping the pressure steady.

A better solution is to use a smaller secondary reservoir which is always kept filled, together with a more perfectly-tailored radiating device, with a controlled coolant flow. But even then, control of the varying pressures associated with the head space gases which need to be siphoned off represents a thorny engineering problem. The fact that no commercially-available fuel delivery system exists today based on this idea is a testament to its inherent intractability.

Another problem encountered with vapor phase fuel delivery systems is the need to control the fuel/air ratio over a wide range to allow for various engine operating conditions. The perfect stoichemetric air to fuel ratio for gasoline is 15:1 by weight or approximately 60:1 by volume. However, in internal combustion engine designs for automobiles, it is necessary for the fuel delivery system to provide a richer fuel mix during accelerations (say, 12:1), and a leaner fuel mix during long-range highway cruising (say, 18:1). Furthermore, in the case of automobile-based internal combustion engines, and other engines which deal with rapidly changing load conditions, the fuel/air ratio demands of the engines can change extremely rapidly, often in a small fraction of a second (viz., 50 milliseconds). It is therefore desirable that a fuel delivery system be able to vary the fuel/air ratio rapidly.

Instead of heating up reservoirs of liquid fuel to accomplish the phase transition of the fuel from liquid to vapor, an alternative scheme is to greatly increase the evaporative surface area of the reservoir so that more vapor will be generated. To this end, several capillary action evaporative wick carburetion schemes have been proposed. However, existing state-of-the-art capillary action evaporative wick carburetor schemes rely on ambient temperature air supplies for volatilization and have proven to be extremely difficult to control. In other words, in some cases they deliver too fuel-rich a mixture, while in other cases they deliver too-lean a mixture. There is no regularity or predictability to their performance.

For instance, Pedersen (U.S. Pat. No. 5,564,399 and U.S. Pat. No. 5,384,074) discloses the use of capillary action evaporative wicks to disgorge fuel vapors to the combustion air supply, but no mention is made of using any type of thermal regulating means to prevent freeze-up, and thus to allow such carburetors to function for extended periods of time. Freeze-up occurs because using a capillary action evaporative wick carburetor means one is essentially running a refrigerator. If thermal regulating means, specifically warming up means of some type or another are not supplied, the capillary action evaporative wick and the associated liquid reservoir will soon cool down (i.e., within seconds) to such an extent that no further vapor will be produced and the carburetor will cease to function. The laminar air flows, and metering schemes Pedersen teaches all mask this underlying issue. No mention is made of a method to bring the appropriate amount of heat to the evaporative wicks of Pedersen which would safely and effectively guarantee the proper functioning of this device for an extended period of time.

It is obvious that schemes which teach the use of capillary action evaporative wicks but do not teach the incorporation of an integral thermal regulating means are not practical devices. Note that beyond the issue of incorporating a thermal regulating means in the first place to counter the evaporative cooling effect of such vapor-generating devices, no mention or discussion is made at all in any of the prior art with regard to how to do this, i.e., what specific approaches to use, or what the technical challenges would be. For instance, would it be better to heat up the gasoline before impregnating the wick with it? Should separate heating elements be placed inside each wick? Should the heat source be exhaust gas? How should the heat source be placed in intimate connection with the fuel to be vaporized? How do you prevent overheating, etc. None of these important technical issues have been addressed in the prior art.

It is an object of the present invention to improve upon existing vapor carburetion schemes and to provide a safe, reliable and effective thermal regulating means for capillary action evaporative wick carburetors to allow them to function for extended periods of time.

Another object of the invention is to provide a reliable method to supply a homogeneous charge with a variable fuel/air ratio to throttle-controlled engines wherein the mechanical throttle setting by itself determines the engine speed.

Another object of the invention is to supply a means to vary the fuel/air ratio which can readily be put under the program control of an intelligent control oriented processor or other such micro-controller that has control of overall engine functions, including spark advance, and electro-mechanical valve timing, so that the fuel/air ratio can be adjusted in concert with these other engine functions electronically to achieve maximum fuel economy and emissions performance.

Another object of the invention is to provide a means of cooling supercharged (or turbo-charged) air-streams after they have come from the supercharger (or turbo-charger) but before they reach the engine. Supercharging, or turbo-charging, is a way to increase the horsepower of an internal combustion engine by increasing the density of the charge admitted to the combustion chambers. To do so, either the exhaust gas stream, or a pulley, or an electric motor is used to supply the force necessary for a blower or compressor to compress the in-rushing combustion air supply before it reaches the engine. The problem with this scheme, however, as that as the air is compressed, the air is also heated up as a natural consequence of Boyle's Law. Thus a 100% efficient supercharger will heat up the air passing through it by approximately 71 degrees Fahrenheit over the ambient air temperature when an 8 psi boost pressure is achieved. This extra heat of the combustion air which is admitted to the combustion chamber decreases the volumetric efficiency of the engine, remains a problem for the engine's cooling system to dissipate, and can lead to unsafe, premature detonation of the fuel/air mixture in spark ignition engines. Therefore makers of superchargers, turbo-chargers, and fuel delivery systems for engines have sought ways to cool the combustion air stream prior to its being admitted into the engine. In general, this practice is known as "inter-cooling" in the industry.

The methods developed for inter-cooling in automotive and marine engine applications may be broadly categorized into two separate categories: those which use heat exchangers in which a large volume of cooler air is brought into intimate contact with the in-rushing combustion air supply in a heat exchanger to lower the temperature of the supercharge, or those in which large quantities of cool water are brought into intimate contact with the in-rushing combustion air supply in a heat exchanger to lower the temperature of the supercharge. In contradistinction, the present invention does not rely on a heat exchanger as such and represents an entirely new and novel method of cooling a supercharge which does not require the additional expense of a heat exchanger and the additional equipment to guide either water or air through the inter-cooler heat exchange system, or the added mechanical inefficiencies and energy wastage associated with doing so, and which furthermore allows the formation of combustible mixture with a variable fuel/air ratio ("charge") in a natural and surprisingly efficient way.

SUMMARY OF THE INVENTION

With regard to vaporous charge formation from liquid fuel, the present invention seeks to overcome some of the limitations and inefficiencies of the prior art. Instead of heating up reservoirs of liquid fuel to accomplish the phase transition of the fuel from liquid to vapor, I rely on a single fuel-absorbent, air-permeable evaporative wick membrane or an array of evaporative wick elements to greatly increase the evaporative surface area of the liquid fuel, and then heat the in-rushing combustion air supply which contacts such surfaces to control the transpiration from them. In such a method, the amount of heat which is supplied to the liquid fuel at the liquid-air interface is just the right amount of heat required for the vaporization, on a moment by moment basis over long-term operation of the device. In other words, by regulating the temperature and quantity of in-rushing combustion air admitted to a primary mixing region to control the heat supplied to the fuel, as it is present on the surfaces of a foraminiferous membrane or an array of transpirating elements, the amount of heat supplied for evaporation is automatically guaranteed to be the correct amount needed for such evaporation, assuming the temperature and quantity of air are correctly regulated. Furthermore, I also heat that portion of the combustion air supply which is admitted to a secondary mixing region to be mixed with the fuel rich air from the primary mixing region to dilute the eventual combustible mixture to the desired fuel strength in order that the evaporated fuel does not re-condense before reaching the combustion chamber. As a further distinction and improvement over the prior art, I am able to control the amount of in-rushing air supply which impacts the transpirating elements in the primary mixing region and the variation of the fuel/air ratio in the generated combustible mixture with a single moving control element. Having only a single moving part in the whole invention to assure its main functionality leads to a practical robustness and more economical construction than presently exists in all of the prior art.

In the design of apparatus employing this novel method, the following equation is useful: N times. fuelvapor=N liquid*exp times. {-.DELTA. .times. .times. H/kT} Boltzmann times. .times. Factor*[(R*T)/(2*.pi.*M)] ½ Kinetic times. .times. Factor [EQUATION times. .times. 1] Where N.sub.fuelvapor=# fuel molecules evaporated per second per cm.sup.2 of surface area N.sub.liquid=# fuel molecules per cm.sup.3 of liquid fuel .DELTA.H=Enthalpy of vaporization of fuel k=Boltzmann Constant T=Temperature of Liquid-Air Interface R=Universal Gas Constant .pi.=3.14159[0028] M=Molecular Weight of Fuel This equation allows one to calculate the number of fuel molecules evaporating from a transpirating surface for any given fuel, given temperature, and given surface area. Another useful equation is: Q=14.86*f*k*Horsepower [EQUATION 2] Where Q=Instantaneous heat required to vaporize fuel (watts)

Horsepower=Shaft Horsepower of engine f=Derating factor of engine (to mechanically convert shaft horsepower to Gross horsepower k=Constant determined by type of fuel used, which for hexane equals 1.0

This equation allows one to calculate the heat which is necessary to supply to the combustion air to ensure the proper volatilization of the fuel. (Note that the value of k above for hexane assumes the hexane in the liquid reservoir is at or just below the liquid-vapor phase change temperature. Use of the molar heat capacity of hexane, the moles of hexane involved, and the temperature difference between the liquid reservoir and the phase change temperature can be used to calculate the heat required for other liquid reservoir temperatures.)

BRIEF DESCRIPTION OF THE DRAWINGS

These and other objects and advantages of the invention will become apparent to those persons having ordinary skill in the art to which the invention pertains from the following description taken in conjunction with the accompanying figures of drawing, wherein.

DETAILED DESCRIPTION OF THE INVENTION

Figure 1:
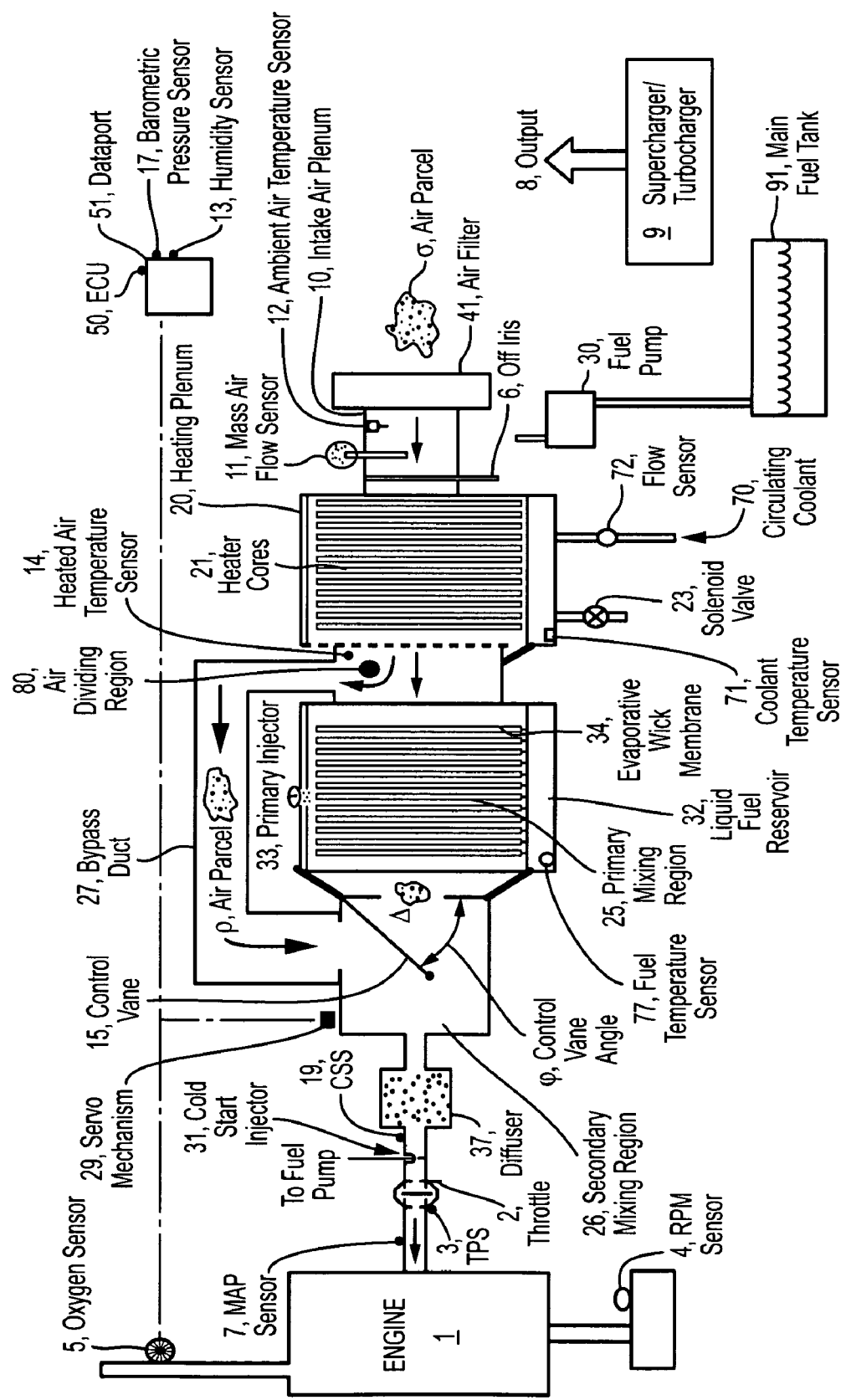
FIG. 1 is an illustration, in schematic, of the invention which shows a particular linear geometry which employs duct-like openings to the secondary mixing region which are perpendicularly opposed, an air dividing region, and a single control element in the form of a swinging control vane. The input and mix air parcels are shown entering the invention and dividing, receiving special treatment, and recombining in a special way inside various parts of the invention.

When used with a supercharger (9), the invention comprises the use of an intake air plenum (10) which receives combustion air from the output airstream (8) of a supercharger, or turbo-charger. When used without a supercharger or turbo-charger, the invention comprises the use of an intake air plenum (10) which draws fresh combustion air (air parcel sigma.) from the atmosphere into the invention for processing. In either case, intake air plenum (10) receives, transmits and defines, an airstream. Since it is desired that the total quantity of air to be combusted is measured, intake air plenum (10) also supports the emplacement of an mass air flow sensor (11). It is also desired that the temperature and humidity of the incoming combustion air be measured. Thus intake air plenum (10) also supports an ambient air temperature sensor (12) and a humidity sensor (13). These sensors communicate the results of their readings concerning the characteristics of the intake airstream (represented by air parcel sigma.) to an electronic control unit, or "ECU" (50). Intake air plenum (10) also supports an air filter (41) which filters out dust and other impurities in the combustion air, allowing only clean air to be passed into the invention. However, when the method is used with a supercharger or turbo-charger (9), and the intake of such device already incorporates such a filter, filter (41) may be dispensed with. Intake air plenum (10) also supports an off iris (6) which can be mechanically or electro-mechanically opened when the device is in operation, or closed to prevent combustible fumes from escaping when the device is not in operation. Air from the intake air plenum (10) is passed to a heating plenum (20) where heater cores (21) are used to raise the temperature of the air depending on the temperature of the engine coolant (70) and the rate of engine coolant flow, established by coolant flow sensor (71). The temperature of the heated air is determined by heated air temperature sensor (14). The rate of coolant flow through the heater cores (21) is controlled by solenoid valve (23) which is opened and closed by electronic control unit, or "ECU" (50). The temperature of the engine coolant is determined by engine coolant temperature sensor (71).

From the heating plenum (20), the air passes into an air dividing region (80) where the intake airstream (represented by air parcel sigma.) is broken into two parts. The first part, represented by air parcel delta., passes into a primary mixing region (25). The primary mixing region (25) consists of an air-tight, impermeable container wherein a fuel-absorbent, air-permeable evaporative wick membrane (34) or, alternatively, an array of evaporative wick elements, repose. The fuel-absorbent, air-permeable evaporative wick membrane (34), or array of evaporative wick elements, are bathed in liquid fuel by a primary injector (33) which may be on top spraying down into it or, more typically, in a secondary liquid fuel reservoir (32) which it (or they) descend into to pick up liquid fuel by capillary action. The primary injector (33) receives its liquid fuel from a fuel pump (30) and a main fuel tank (91). The temperature of the liquid fuel is monitored by fuel temperature sensor (77) which supplies the fuel temperature information to the ECU (50) for the purpose of calculating the heat needed to supply to the primary mixing region (25), via Equation 2.

The heated, in-rushing air impinges on the fuel impregnated material of the fuel-absorbent, air-permeable evaporative wick membrane (34) or array of evaporative wick elements and by thermodynamic action evaporates a certain portion of the liquid fuel from them. This fuel-enriched air then flows to an intake port of the secondary mixing region (26) where it is more or less impeded by the control vane (15) which makes an angle psi with the plane of the intake port. As psi is increased from its minimum of 0 degrees to its maximum of 90 degrees, more and more fuel-enriched air is allowed to pass through the primary mixing region (25) and into the secondary mixing region (26). Conversely, less and less air from the bypass duct (27), which communicates non-fuel enriched air from the air dividing region (80) to the secondary mixing region (26) is allowed to pass through the bypass duct (27) and into the secondary mixing region (26) via the other intake port (viz., air parcel rho). Under optimal conditions and in normal operation, the arithmetic sums of the amounts of air leaving the air dividing region (80) equal the arithmetic sums of the amounts of air recombining in the secondary mixing region (.sigma.=.DELTA.+.rho.). The control vane's position and thus the fuel-to-air ratio is adjusted on a moment to moment basis by a servomechanism (29) which receives its signals from the ECU (50). The air from the secondary mixing region (26) passes through a diffuser (37) which consists of fine metal screens or metal wool. The purpose of the diffuser is to homogenize the charge from the secondary mixing region and to serve as a flame arrestor in the event of engine backfire, thus preventing possible damage to the invention. The strength of the combustible mixture ("charge") thus formed is then measured by a charge strength sensor ("CSS") (19), which in practice may consist of an optical absorption spectroscopy device. The charge is then directed to the throttle (2), where it is valved into the engine (1) according to demand. The throttle (2) thus controls the absolute amount of combustible mixture passing through the invention and entering the engine, while the control vane (15) controls the (relative) strength of the combustible mixture. The position of the throttle (2) is measured by throttle position sensor (3), or "TPS". This sensor continuously feeds its information to ECU (50).

In order that the control vane angle psi be determined properly, the ECU (50) also receives signals from an oxygen sensor (5) which monitors the exhaust gas stream to determine the percentage oxygen depletion of the exhaust gas. The ECU (50) also receives data from an rpm sensor (4), a humidity sensor (13) and a barometric pressure sensor (17) and uses this data, along with the data from the charge strength sensor ("CSS") (19), fuel temperature sensor (77), mass air flow sensor (11), manifold air pressure sensor, and throttle position sensor (3) to calculate a correct control vane position. ECU (50) is also provided with a data port (51) so that signals relating to spark plug timing advance and valve timing can be used in calculations related to the desired control vane position. When the invention is used in conjunction with an internal combustion engine for automotive applications, under normal driving conditions the control vane is adjusted so that an air-to-fuel ratio of 60:1 (v-v) is achieved; however, when additional power is needed, the air-to-fuel ratio can be adjusted so that it is much richer than this; conversely, when economical long-range cruising is desired, the air-to-fuel ratio can be made considerably leaner.

The ECU (50) also calculates the proper flow rate of engine coolant through the heater core(s) (21) so that the proper heated air temperatures can be achieved. Increased coolant flows lead to higher combustion air temperatures and therefore greater evaporation of fuel in the primary mixing region (25). The coolant flow through the heat exchanger can be adjusted by the ECU either by energizing and de-energizing a coolant flow solenoid valve (23), and relying on the engine's main coolant pump for liquid motion, or by energizing and de-energizing a secondary coolant pump which is dedicated to cycling the hot coolant from the engine through the heat exchanger and then back to the engine's coolant system. Alternatively, a mechanical thermostatically-controlled valve can be used as an auxiliary control to control the coolant flow.

If ECU (50) senses that there is not enough heat in the combustion air admitted to the primary mixing region (25), based on its reading of the engine load and the heat required to evaporate a sufficient amount of fuel for the engine's requirements (via Equation 2), the ECU can augment the fuel strength of the combustible mix reaching the engine by selectively energizing a secondary fuel injector ("cold start injector" (31)) located downstream of the secondary mixing region (26) and upstream of the throttle (2).

The above-disclosed mechanical arrangement, wherein a single control element (i.e., a control vane) admits more fuel-rich air while at the same time closes off the supply of fuel free air when moving in one direction; and closes off the supply of fuel-rich air while admitting more fuel-free air when moving in the other direction, is an extremely advantageous one because it allows for a very rapid and precise way to control the mixture strength, and one which can be implemented extremely economically; it is also one which is very robust in operation.

Figure 2:
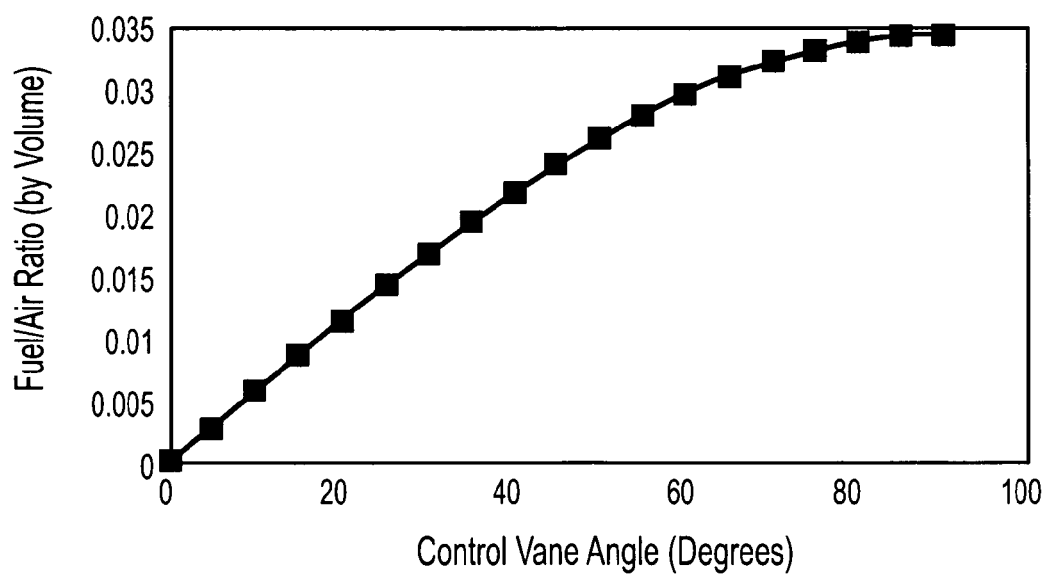
FIG. 2 is a graph of the quasi-linear mixing function achieved using the invention.

In order to more clearly understand the functional advantages of the invention, with regard to its ability to accurately form a charge with a variable fuel/air ratio, reference can be made to a quasi-linear mixing function. A quasi-linear mixing function can be constructed which will give the method's resulting fuel/air ratio for a given control vane (or other moving element) position. Such a mixing function is shown in FIG. 2. If the air/fuel ratio of the charge coming from the primary mixing region is 30:1 (v-v), then a control vane angle position of 90 degrees will determine a mixture strength of 30:1 (v-v) in the secondary mixing region, while a control vane angle position of 45 degrees will determine a mixture strength of 60:1 (v-v), etc. While the mixing function is in general quasi-linear, over the range of most significant interest (i.e., near a control vane angle of 45 degrees) the function is highly linear. This makes electronic control of the mixture strength with a dedicated servomechanism very easy.

In practice, the ECU (50) determines the control element position based upon its consultation with the numerous sensors of the invention, data on spark plug and valve timing received from data port (51) and a mixture look-up table or embedded software algorithm which calculates the desired mixture strength based on a variety of theoretically and empirically-derived factors. In general, the electronic control unit ("ECU") is a Control Oriented Processor ("COPS") or other such microcontroller, or an intelligent network of such devices, containing at least one microprocessor.

When used with a supercharger (9), the intake air plenum (10) is connected to the output (8) of the supercharger (9) and the ambient air temperature sensor (12) is used to monitor the temperature of the output air from the supercharger (9). In some cases, depending on ambient conditions, the temperature and heat content of the supercharged air thus obtained as a combustion air source will be sufficient to vaporize all the fuel needed for engine operation and dramatic cooling (up to 40 degrees Celsius) of the supercharged air will result. However, in other cases, for instance on very cold days, when full power is needed from the engine for extended periods of time, additional heating of the air admitted to the air dividing region (80) becomes necessary. In these cases, under command from the ECU (50), the coolant flow solenoid valve (23) is energized, hot coolant is allowed to flow into the heater cores, and the heater cores are used to augment the temperature of the combustion air when the ambient air temperatures, even after being boosted by the supercharging process, are too low to support the vaporization of the fuel at a particular load. In this case, the ECU (50) can energize the coolant flow solenoid valve (23) at a higher duty cycle rate to ensure that additional heat is available to volatilize the fuel necessary for proper engine operation. Obviously this will interfere with the supercharge cooling function, but it is more important that the engine continue to run smoothly, rather than to achieve full supercharged volumetric efficiency under some operating conditions. However, under a wide range of operating conditions, very little additional heat is necessary. The supercharging process creates all that is needed for proper fuel volatilization, and the benefit of effective charge cooling is achieved.

MODE OF OPERATION OF THE INVENTION

During the operation of the device, when a "Fresh Start" signal is received from the ignition switch, the electronic control unit (50) monitors the ambient air temperature sensor (12), the heated air temperature sensor (14), the mass air flow sensor (11), the coolant temperature sensor (71), the coolant flow sensor (72), and the engine load (via signals from the rpm sensor (4) and the manifold absolute pressure sensor (7)) to determine whether or not there is enough heat in the flowing coolant (70) and in the source of combustion air to vaporize the fuel required for proper engine operation. If there is not, the control logic resident in the ECU supplies the proper signals to the cold start injector (31) in the throttle body to ensure that the engine receives the proper amount of fuel to start. As time goes on during the engine operation cycle, the engine will warm up and additional heat will be available from the coolant. Note that the coolant supply for the main device heat exchanging section (i.e., the heating plenum (20)) can be obtained from the engine block before encountering the thermostat, so that the heat available to the invention is always the maximum amount possible from the engine. When the control logic determines that the flowing coolant (70) and the source of combustion air have enough heat available between them to safely deliver the amount of heat needed for proper fuel volatilization, the electronic control unit (50) slowly opens the control element (15) so that in-rushing combustion air will be admitted to the primary mixing region (25) and so that fuel-rich air will pass through the secondary mixing region (26) and on to the engine (1). At the same time, the ECU (50) slowly decreases the frequency and/or pulse width of the signals supplied to the cold start injector (31) so that proportionately less and less fuel is supplied in that manner, and more and more is supplied in proper molecular vapor form. Supplementary signals from the oxygen sensor (5) which determines whether or not the engine is receiving a proper fuel-air mix, help determine the proper balance of signals supplied to the cold start injector (31) and control element servomechanism (29).

As the signals to the cold start injector are winding down and eventually shut off all together, the ECU (50) continues to monitor the ambient air temperature sensor (12), the heated air temperature sensor (14), the mass air flow sensor (11), the coolant temperature sensor (71), the coolant flow sensor (72), and the engine load (via signals from the rpm sensor (4), throttle position sensor (3), and manifold absolute pressure sensor (7)) to determine whether or not there is enough heat in the flowing coolant (70) and in the source of combustion air to fully vaporize the fuel required for proper engine operation. Using an on-board look-up table or algorithm which is specific to the type of liquid fuel utilized, and/or using feedback from the oxygen sensor (5) and/or charge strength sensor (19), the ECU (50) delivers a signal to the moving control element servomechanism (29) which establishes the control element position in order to control the amount of fuel-rich air admitted to the secondary mixing region.

Smooth and continuous variations in the fuel/air ratio, such as are necessary to obtain maximum fuel economy, or increased power, can be effected by moving the control element to a different position to change the relative flows of fuel-rich and fuel-free air flowing into the secondary mixing region. The control element position also affects the division of the air in the air dividing region (80) and therefore the absolute flows into the primary mixing region (25) and the bypass duct (27). With regard to the first preferred embodiment, as the control vane (15) moves closer and closer to the primary mixing region port, and away from the bypass duct port, it allows more and more fuel-free air from the bypass duct into the secondary mixing region and less and less fuel-rich air from the primary mixing region into the secondary mixing region and so effects a leaner mixture. Similarly, in another preferred embodiment, extension of a moving bellows upward toward a closer proximity to a bypass plenum will also establish a leaner mixture as well, since progressively more and more air comes from the bypass plenum rather than from the primary mixing region. The relative amounts of fuel-rich and fuel free air which combine in the secondary mixing region (26), as well as the degree to which the fuel-rich air has been enriched by fuel during the passage through the primary mixing region, determines the fuel-air ratio of the resultant charge.

In the case of the first preferred embodiment (See FIG. 1), the control element is a swinging control vane (15) and the positioning servomechanism (29) is a DC pulse width-modulated servomotor (Hobbico Model CS-72) which receives signals from a PONTECH SV203 servomotor controller, comprising part of the electronic control unit (50). The servomotor has a 60 degree response time of 190 milliseconds; i.e., it can move 1 degree in 3.16 milliseconds. Therefore, after the servomotor receives input from the servomotor controller, it can deliver a response to enrich the fuel-air ratio from a minimum fuel consumption value of 1:16 to a maximum power ratio of 1:12.5, as for instance might occur during the encounter with a sudden unexpected, heavy load, in 16.6 milliseconds. Since the limit of human perception is about 30 milliseconds, such an adjustment is not particularly noticeable to a human being. It is not very noticeable to a machine either since at 3,000 rpm each crankshaft revolution would take 20 milliseconds to achieve. The entire useable range of gasoline explosive mixtures, from 8:1 to 22:1 by weight can be traversed in 70.1 milliseconds.

I claim:

1. A method to generate and deliver a homogeneous charge with a variable fuel to air ratio to an internal combustion engine comprising: communicating a source of combustion air to a heating plenum; heating said combustion air in said heating plenum using the engine's circulating coolant passing through radiant and heat conductive core(s); communicating the resulting heated combustion air to an air dividing region; dividing said heated combustion air into two parts, a first part which communicates, via a passageway, with a primary mixing region where a fuel-impregnated, air-permeable evaporative wick membrane or array of evaporative wick elements, which is disposed to receive passage of the air, enriches such impinging air with a molecular vapor of fuel, and a second part which communicates via a bypass duct to a secondary mixing region where it is re-combined with said first part of the heated combustion air; controlling the fuel to air ratio of the resulting combustible mixture using a single moving control element which is able to deflect more or less of each said first and second parts of air into the secondary mixing region; communicating the charge thus formed in the secondary mixing region to a throttle; regulating the flow of the mixed charge formed using said throttle; communicating the charge, after it has passed through the throttle, to an intake manifold or combustion chamber of the engine.

2. The method of claim 1 in which the moving control element consists of swinging vane operating between two duct openings which are substantially perpendicularly opposed.

3. The method of claim 1 in which the quantity of air admitted to said air dividing region is first measured by a mass air flow sensor.

4. The method of claim 1 in which an automatic electronic control unit ("ECU") is used to determine the position of the moving control element, to monitor the engine load, manifold pressure, speed, and throttle position, to monitor the temperature of the incoming combustion air before and after passing the primary mixing region, to monitor the temperature of the fuel, and to calculate and properly adjust the coolant flow through said radiant and heat conductive cores to properly regulate the heat content of the airstream before entering the air dividing region.

5. The method of claim 1 in which an optical charge strength sensor, operating on one of the C-H stretch, bending, or overtone absorption bands measures the concentration of fuel in the charge after it has been formed and provides that information to an electronic control circuit.

6. The method of claim 1 in which a secondary cold start fuel injector is placed in a ducted air passageway leading to the engine in order to first start the engine with liquid fuel before the engine has warmed up enough to permit the full volatilization of the fuel using the engine's circulating coolant.

7. The method of claim 1 in which a diffuser plate or screen is disposed between the secondary mixing region and the throttle in order to further homogenize the recombined airstream.

8. The method of claim 1 in which an oxygen sensor or other exhaust gas analyzing means is used to monitor the exhaust gas stream and to provide information to the electronic control for the purpose of adjusting the single moving control element angle to the proper position.

9. Apparatus to generate and deliver a homogeneous charge of molecular vapor with a variable fuel to air ratio to an internal combustion engine comprising: an intake air plenum communicating a source of combustion air to a heating plenum; said heating plenum wherein said combustion air is heated using the engine's circulating coolant passing through radiant and heat conductive core(s) in a controllable manner, under direction from an electronic control unit; an air dividing region wherein said combustion air, coming from said heating plenum, is divided into two parts, a first part which communicates with a primary mixing region where a fuel-impregnated evaporative wick membrane or array of evaporative wick elements, which is disposed to receive passage of the air, enriches such impinging air with a molecular vapor of fuel, and a second part which communicates via a bypass duct to a secondary mixing region where it is re-combined with said first part of the airstream in a controllable ratio using a single moving control element which is able to deflect more or less of each said first and second parts of air into the secondary mixing region and thereby selectively control the fuel to air ratio of the resulting charge, said secondary mixing region communicating via a ducted passageway to the throttle and thence on to the intake manifold of the engine.

10. The apparatus of claim 9 in which said moving control element consists of swinging vane operating between two duct openings which are substantially perpendicularly opposed.

11. The apparatus as set forth in claim 9 further comprising means to measure the flow of air admitted to said air dividing region.

12. The apparatus as set forth in claim 9 further comprising automatic electronic control means to monitor the engine load, manifold pressure, throttle position, and speed and to monitor the fuel temperature, temperature of the incoming combustion air, and temperature of the flowing engine coolant, to adjust the strength of the current flow through said radiant and heat conductive cores to regulate the heat content of the air before entering the air dividing region, and to determine the position of the moving control element so as to control the mixture strength.

13. The apparatus as set forth in claim 9 further comprising optical sensing means to measure the amount of vaporous hydrocarbon fuel in the charge.

14. The apparatus of claim 9 further comprising a secondary cold start fuel injector placed in one of the ducted air passageways of the invention in order to first start the engine with liquid fuel before the engine has warmed up enough to permit the volatilization of the fuel using the engine's circulating coolant.

15. The apparatus of claim 9 further comprising a diffuser plate or screen disposed between the secondary mixing region and the throttle in order to further homogenize the recombined air parcel.

16. The apparatus of claim 9 further comprising exhaust gas analyzing means to monitor the physical characteristics of the exhaust gas stream to provide information to the electronic control unit for the purpose of adjusting the position of the single moving control element for optimum engine fuel economy and emissions performance.

17. The apparatus as set forth in claim 9 further comprising a supercharger or turbocharger which supplies a source of heated, pressurized combustion air to the intake air plenum.

18. A method to cool a supercharged or turbo-charged airstream and to generate and deliver a homogeneous charge of molecular vapor with a variable fuel to air ratio to an internal combustion engine comprising: communicating the output from a supercharger or turbo-charger to an air dividing region where the airstream is divided into two parts, a first part which communicates, via a passageway, with a primary mixing region where a fuel-impregnated evaporative wick membrane, or array of evaporative wick elements, which is disposed to receive passage of the air enriches such air with a molecular vapor of fuel, and a second part which communicates via a bypass duct to a secondary mixing region where it is re-combined with said first part of the airstream in a controllable ratio using a single moving control element which is able to deflect more or less of each said first and second parts of the airstream into the secondary mixing region and thereby selectively control the fuel to air ratio of the resulting charge; communicating the resulting charge via a duct to a throttle and thence on to the intake manifold of the engine.

* * * * *